United States Patent
Sumi et al.

(10) Patent No.: US 9,759,925 B2
(45) Date of Patent: Sep. 12, 2017

(54) THREE-DIMENSIONAL IMAGE DISPLAY APPARATUS

(71) Applicants: Innocom Technology (Shenzhen) Co., Ltd, Shenzhen, Guangdong Province (CN); Innolux Coporation, Miao-Li County (TW)

(72) Inventors: Naoki Sumi, Miao-Li County (TW); Toshihiko Araki, Miao-Li County (TW)

(73) Assignees: INNOCOM TECHNOLOGY (SHENZHEN) CO., LTD, Shenzhen, Guangdong Province (CN); INNOLUX CORPORATION, Jhu-Nan, Miao-Li County (TW)

( * ) Notice: Subject to any disclaimer, the term of this patent is extended or adjusted under 35 U.S.C. 154(b) by 181 days.

(21) Appl. No.: 14/536,147

(22) Filed: Nov. 7, 2014

(65) Prior Publication Data

US 2015/0062470 A1    Mar. 5, 2015

Related U.S. Application Data

(63) Continuation-in-part of application No. 13/602,014, filed on Aug. 31, 2012, now Pat. No. 8,908,113.

(51) Int. Cl.
| | | |
|---|---|---|
| *G02F 1/1333* | (2006.01) | |
| *G02B 27/22* | (2006.01) | |
| *H04N 13/04* | (2006.01) | |
| *G02B 3/00* | (2006.01) | |
| *G02B 3/14* | (2006.01) | |

(52) U.S. Cl.
CPC ....... *G02B 27/2214* (2013.01); *G02B 3/0043* (2013.01); *H04N 13/0404* (2013.01); *G02B 3/005* (2013.01); *G02B 3/14* (2013.01)

(58) Field of Classification Search
CPC .............. G02B 21/2214; G02B 3/0043; H04N 13/0404
See application file for complete search history.

(56) References Cited

U.S. PATENT DOCUMENTS

| 7,564,507 B2 | 7/2009 | Park | |
|---|---|---|---|
| 2014/0125777 A1* | 5/2014 | Kang | G02B 27/2214 348/51 |
| 2014/0340292 A1* | 11/2014 | Kashiwagi | G02B 27/26 345/87 |

FOREIGN PATENT DOCUMENTS

TW    201409083    3/2014

* cited by examiner

*Primary Examiner* — James Dudek
(74) *Attorney, Agent, or Firm* — Muncy, Geissler, Olds & Lowe, P.C.

(57) ABSTRACT

A three-dimensional (3D) image display apparatus includes a display panel and a 3D image optical structure. The display panel has pixels arranged in an array and the pixels have a first region and a second region disposed adjacent to each other. The 3D image optical structure includes a plurality of first optical units disposed along a first direction. Each first optical unit has at least one first portion corresponding to the first region and at least one second portion corresponding to the second region. The first portion has a first curvature radius and a plurality of corresponding first circle centers, and the second portion has a second curvature radius and a plurality of corresponding second circle centers. The first curvature radius is different from the second curvature radius, and the first circle centers are not overlapped with the second circle centers in the vertical projection direction.

9 Claims, 20 Drawing Sheets

THREE-DIMENSIONAL IMAGE DISPLAY APPARATUS

CROSS REFERENCE TO RELATED APPLICATIONS

This application is a Continuation-In-Part (CIP) of an earlier filed, pending, application, having application Ser. No. 13/602,014 and filed on Aug. 31, 2012, the content of which, including drawings, is expressly incorporated by reference herein.

BACKGROUND

Technical Field

The present disclosure relates to a display apparatus and, in particular, to a three-dimensional (3D) image display device.

Related Art

In general, three-dimensional (3D) image display apparatuses are categorized into stereoscopic display apparatuses and autostereoscopic display apparatuses (also referred to naked-eye type 3D image display apparatuses). Regarding to the stereoscopic display apparatus, the user has to wear a viewing aid, such as shutter glasses, so that the left and right eyes of the user can receive different images respectively, and thereby perceiving a 3D image. Regarding to the autostereoscopic display apparatus, a specially designed optical element, such as a parallax barrier, is configured so as to allow the display apparatus to provide different images to the left and right eyes of a user respectively, so that the user can perceive a 3D image by naked eyes.

FIG. 1 is a schematic diagram of a conventional autostereoscopic display apparatus 1, which includes a display panel 11 and a parallax barrier 12. The display panel 11 includes two substrates 111 and 112, and a liquid crystal layer 113 sandwiched therebetween. In addition, the substrate 111 has a pixel array consisting of a plurality of pixels (not shown) disposed thereon. Each pixel corresponds to at least one liquid crystal cell (e.g. the liquid crystal cell 113a or 113b) of the liquid crystal layer 113. The parallax barrier 12 includes two substrates 121 and 122 opposite to each other, liquid crystal cells 123 and 124 disposed between the substrates 121 and 122, two sets of strip electrodes 125 and 126 arranged alternately on a surface of the substrate 121, and a surface electrode 127 disposed on a surface of the substrate 122.

When the surface electrode 127 and the strip electrode set 125 are grounded and the strip electrode set 126 is connected to a high voltage, the liquid crystal cells 123 corresponding to the strip electrode set 125 are not driven, and the liquid crystal cells 124 corresponding to the strip electrode set 126 are driven. As such, when the light rendered by the display panel 11 passes through the parallax barrier 12, the light cannot pass through the driven liquid crystal cells 124 and can merely pass through the non-driven liquid crystal cells 123. Therefore, the image rendered by the display panel 11 would be transformed into an image with a parallax barrier pattern that is capable of providing a left-eye image (such as the image from the pixels corresponding to the liquid crystal cells 113b) and a right-eye image (such as the image from the pixels corresponding to the liquid crystal cells 113a) respectively to a user's left and right eyes. Upon receiving the signals of the left- and right-eye images, the user's brain may perceive a 3D image.

Nowadays, many display devices can rotate with respect to a base or a body of an electronic device. For example, a display apparatus is under a landscape mode when it is horizontally oriented (that is, the long side of the display apparatus is oriented to be horizontal); otherwise, a display apparatus is under a portrait mode when it is vertically oriented (that is, the long side of the display apparatus is oriented to be vertical).

However, the parallax barrier 12 of the conventional 3D image display apparatus 1 employs liquid crystal cells to form the light-shielding structure. When operating under the portrait mode, even if an opening ratio of the parallax barrier is optimized to reduce the moiré and color shift issue, the liquid crystal cells in the proximity of the peripheral of the electrodes may not be rotated completely or the distribution thereof may be uneven. Accordingly, the users may suffer from the color shift and moiré issues due to the difference of the viewing angles, thereby affecting the entire displaying effect.

Therefore, it is an important subject to provide a 3D image display apparatus that can reduce the moiré issue and prevent the color shift, thereby improving the displaying effect.

SUMMARY

In view of the foregoing subject, an objective of the present disclosure is to provide a three-dimensional (3D) image display apparatus that can reduce the moiré issue and prevent the color shift, thereby improving the displaying effect.

The present disclosure discloses a three-dimensional (3D) image display apparatus, comprising a display panel and a 3D image optical structure. The display panel has a plurality of pixels arranged in an array, and the pixels have a first region and a second region disposed adjacent to each other. The 3D image optical structure is disposed on one side of the display panel and comprises a plurality of first optical units disposed along a first direction. Each of the first optical units has at least one first portion and at least one second portion. The first portions of the first optical units correspond to the first region, and the second portions of the first optical units correspond to the second region. The first portion has a first curvature radius and a plurality of corresponding first circle centers, the second portion has a second curvature radius and a plurality of corresponding second circle centers. The first curvature radius is different from the second curvature radius, and the first circle centers are not overlapped with the second circle centers in the vertical projection direction.

To achieve the above objective, the present invention discloses a three-dimensional (3D) image display apparatus, which includes a display panel and a 3D image optical structure. The display panel has a plurality of pixels arranged in an array, and the pixels have a first region and a second region disposed adjacent to each other. The 3D image optical structure is disposed on one side of the display panel and includes a plurality of first optical units. The first optical units are disposed along a first direction, and each of the first optical units has at least one first portion and at least one second portion. Each of the first portions of the first optical units corresponds to the first region, and each of the second portions of the first optical units corresponds to the second region. The first portion is asymmetric to an axis that is orthogonal to the display panel and the second portion is also asymmetric to the axis.

As mentioned above, in the 3D image display apparatus of the disclosure, the first portion has a first curvature radius and the second portion has a second curvature radius, and the first curvature radius is different from the second curvature radius. Otherwise, the first portion is asymmetric to an axis that is orthogonal to the display panel and the second portion is also asymmetric to the axis. Accordingly, this invention can reduce the moiré issue of optical interference and avoid the color shift, thereby improving the display effect.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
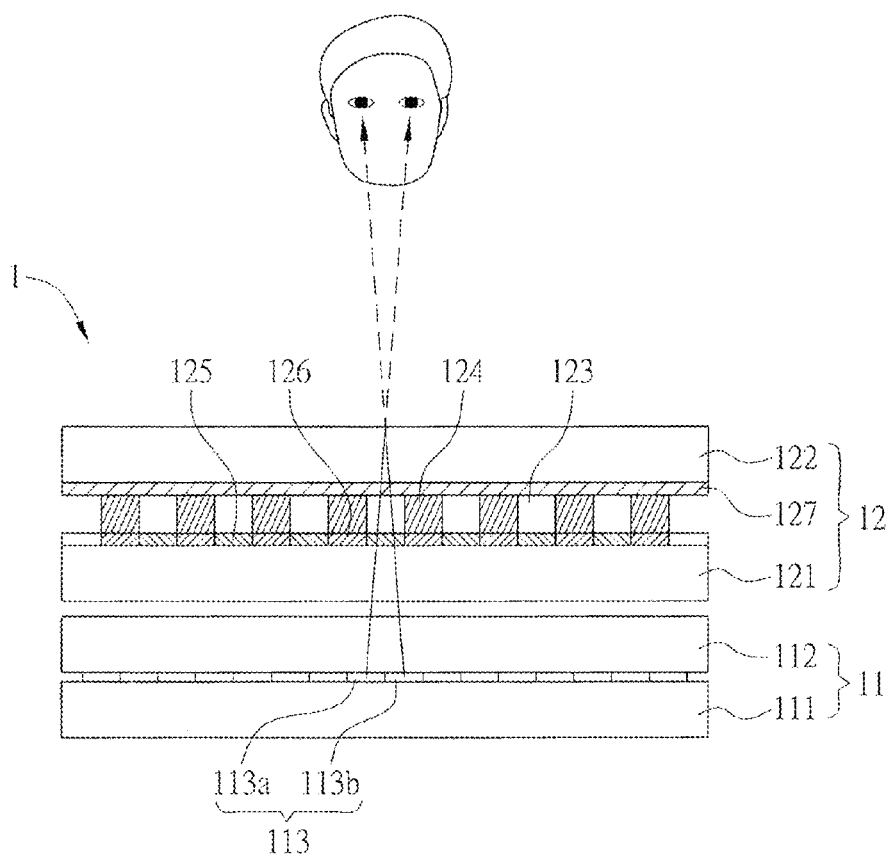
FIG. 1 is a schematic diagram of a conventional autostereoscopic display apparatus.
Figure 2A:
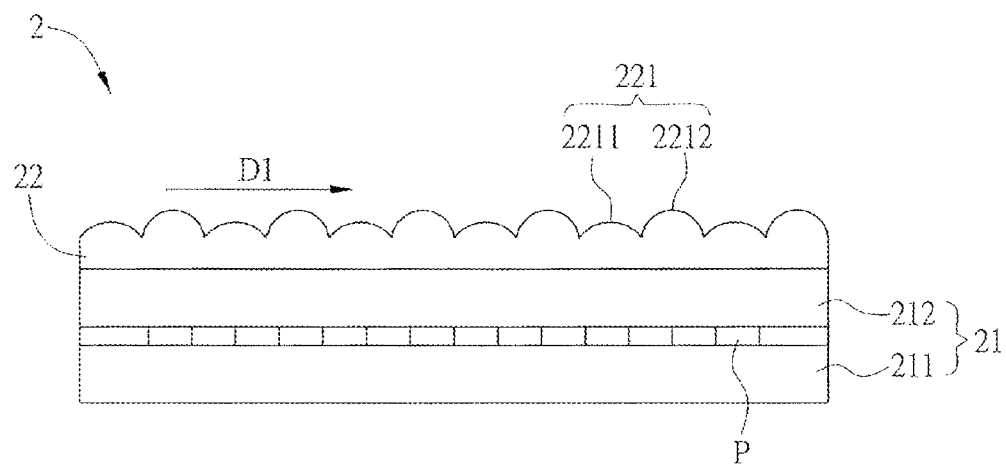
FIGS. 2A to 2C are schematic diagrams showing a 3D image display apparatus according to a preferred embodiment of the disclosure.
Figure 2B:
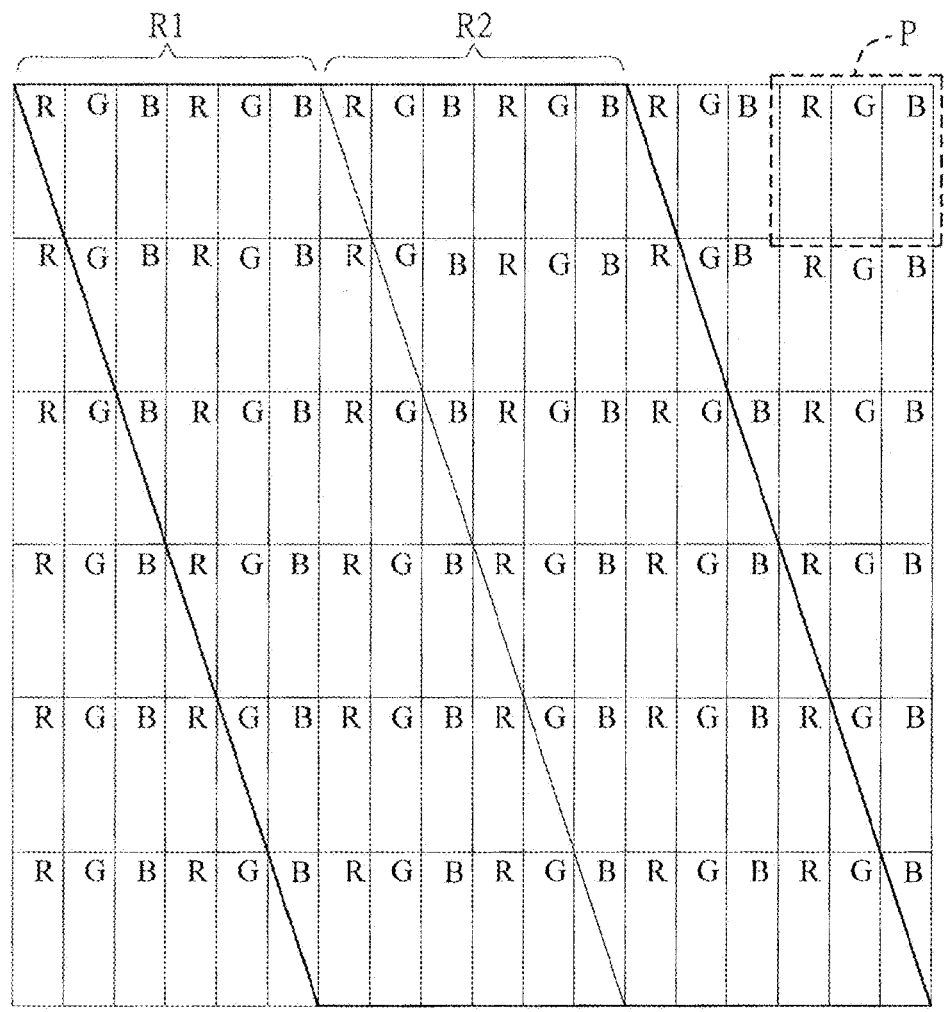
Figure 2C:
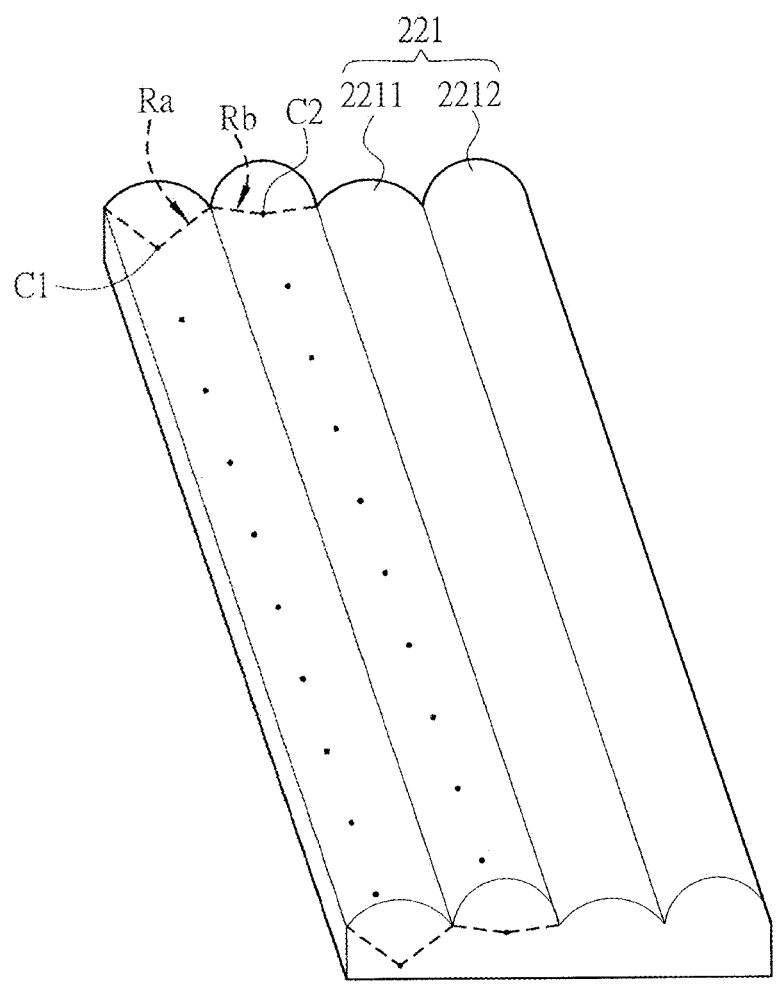

FIGS. 2A to 2C are schematic diagrams showing a three-dimensional (3D) image display apparatus 2 according to a preferred embodiment of the disclosure. The 3D image display apparatus 2 includes a display panel 21 and a 3D image optical structure 22. In practice, the display panel 21 can be any device for displaying two-dimensional image such as a LCD panel, an electroluminescent display panel, or an electrophoretic display panel.

In this embodiment, the display panel 21 is a LCD panel, which has two opposite substrates 211 and 212, and a plurality of pixels P. The pixels P are disposed between the substrates 211 and 212, and arranged in an array. Each pixel P includes three sub-pixels R, G and B, and the pixels P sequentially provide the left-eye image and the right-eye image according to their positions. Of course, each pixel P may include two, four or more sub-pixels. The display panel 21 outputs image data and is a means for providing image data.

The display panel 21 may further include a polarizing plate (not shown), which is disposed on one surface of the substrate 211 or 212. In addition, the display panel 21 may further include a color filter plate (not shown) for displaying the two-dimensional colorful images. In operation, a light source (e.g. a backlight module) is configured at the light input surface of the display panel 21. The materials and configurations of the polarizing plate, color filter plate and/or backlight module are well known to those skilled persons, so the detailed descriptions thereof will be omitted.

The 3D image optical structure 22 is disposed at one side of the display panel 21 and has a plurality of first optical units 221 disposed adjacent to each other. The first optical units 221 are disposed on the display panel 21 along a first direction D1. Each first optical unit 221 has a first portion 2211 corresponding to a first region R1 of the pixels P and a second portion 2212 corresponding to a second region R2 of the pixels P. The second portion 2212 is disposed adjacent to the first portion 2211 and disposed along the first direction D1. In more detailed, a region of the pixels P covered by the vertical projection of the first portions 2211 of the first optical units 221 is defined as the first region R1, and a region of the pixels P covered by the vertical projection of the second portions 2212 of the first optical units 221 is defined as the second region R2. In this embodiment, a width of the first region R1 and a width of the second region R2 are equal to the width of two pixels P, respectively, and an area of the first region R1 is equal to an area of the second region R2. To be noted, the first optical units 221 are arranged in slant on the display panel. That is, a long side of each first optical unit 221 and a long axis of the first region R1 form a non-zero included angle, which is preferred $\arctan(1/3)$ or $\arctan(1/6)$.

In this embodiment, each first optical unit 221 is an optical lens, such as a lenticular lens, and the first portion 2211 and the second portion 2212 have protrusions opposite to the display panel 21 with different curvature radiuses. A first curvature radius Ra of the first portion 2211 is larger than a second curvature radius Rb of the second portion 2212. The first curvature radius Ra of the first portion 2211 corresponds to a plurality of first circle centers C1, and the second curvature radius Rb of the second portion 2212 corresponds to a plurality of second circle centers C2. Herein, the first curvature radius Ra is different from the second curvature radius Rb, and the first circle centers C1 are not overlapped with the second circle centers C2 in the vertical projection direction. Thus, a line constructed by the first circle centers C1 and a line constructed by the second circle centers C2 are parallel, while the first circle centers C1 and the second circle centers C2 are vertically projected in the same plane. Regarding to the first portion 2211, the light is projected to the pixel P in the focus-out method. In other words, the first region R1 and the second region R2 will have different light transmittance ratios. The second region R2 corresponding to the second portion 2212 has smaller effective aperture ratio via the optical lens, and the first region R1 corresponding to the first portion 2211 has larger effective aperture ratio via the optical lens. The compensation of the aperture ratios of adjacent regions R1 and R2 can effectively reduce the moiré issue and prevent the color shift. Therefore, the 3D image optical structure 22 is a means for compensating aperture ratios.

Figure 3A:
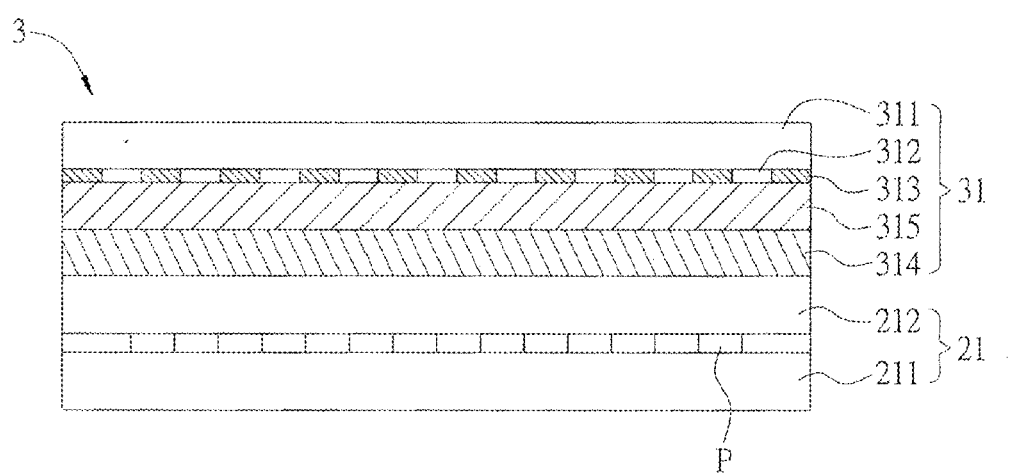
FIGS. 3A to 3C are schematic diagrams showing another 3D image display apparatus according to the embodiment of the disclosure.
Figure 3B:
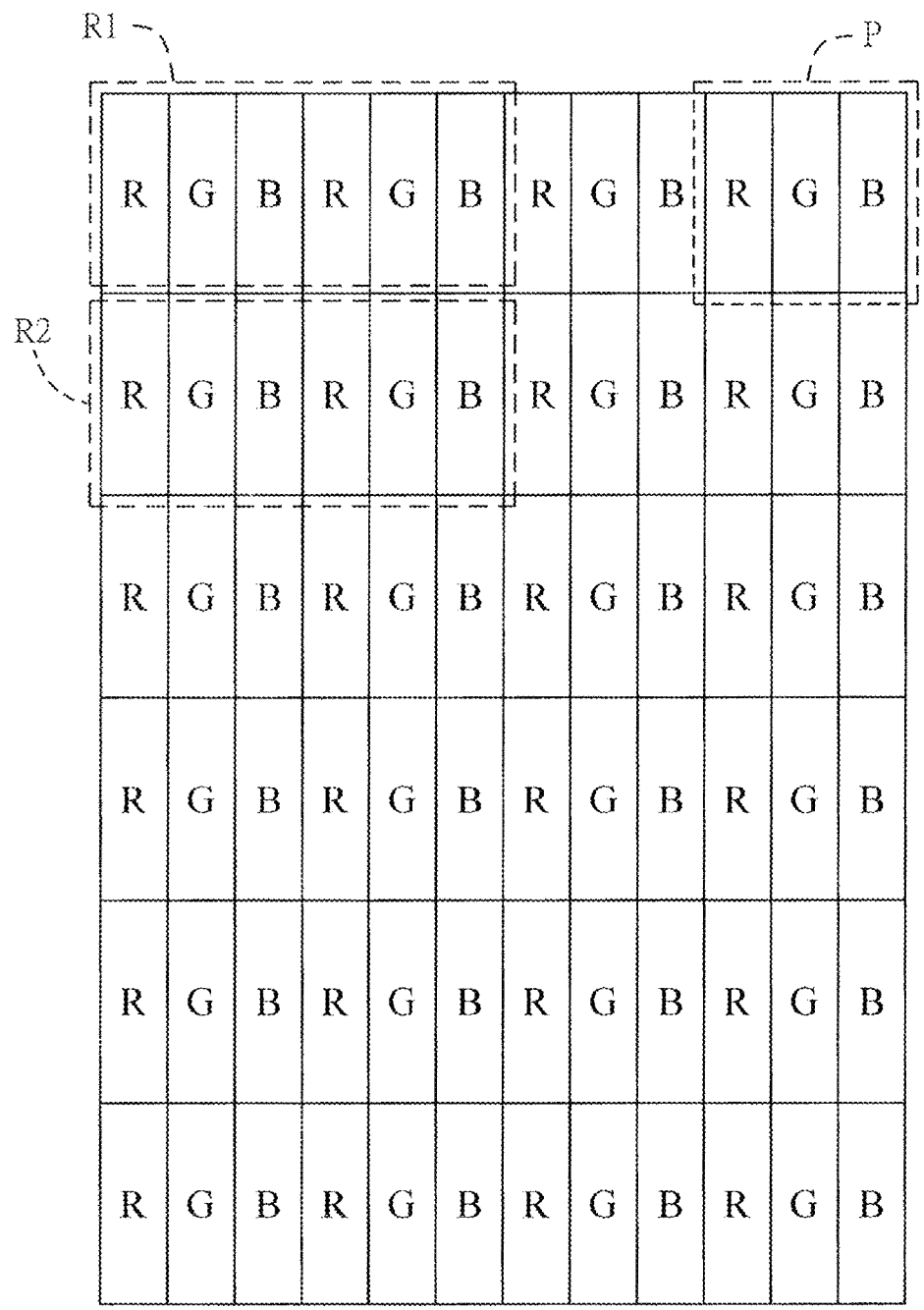
Figure 3C:
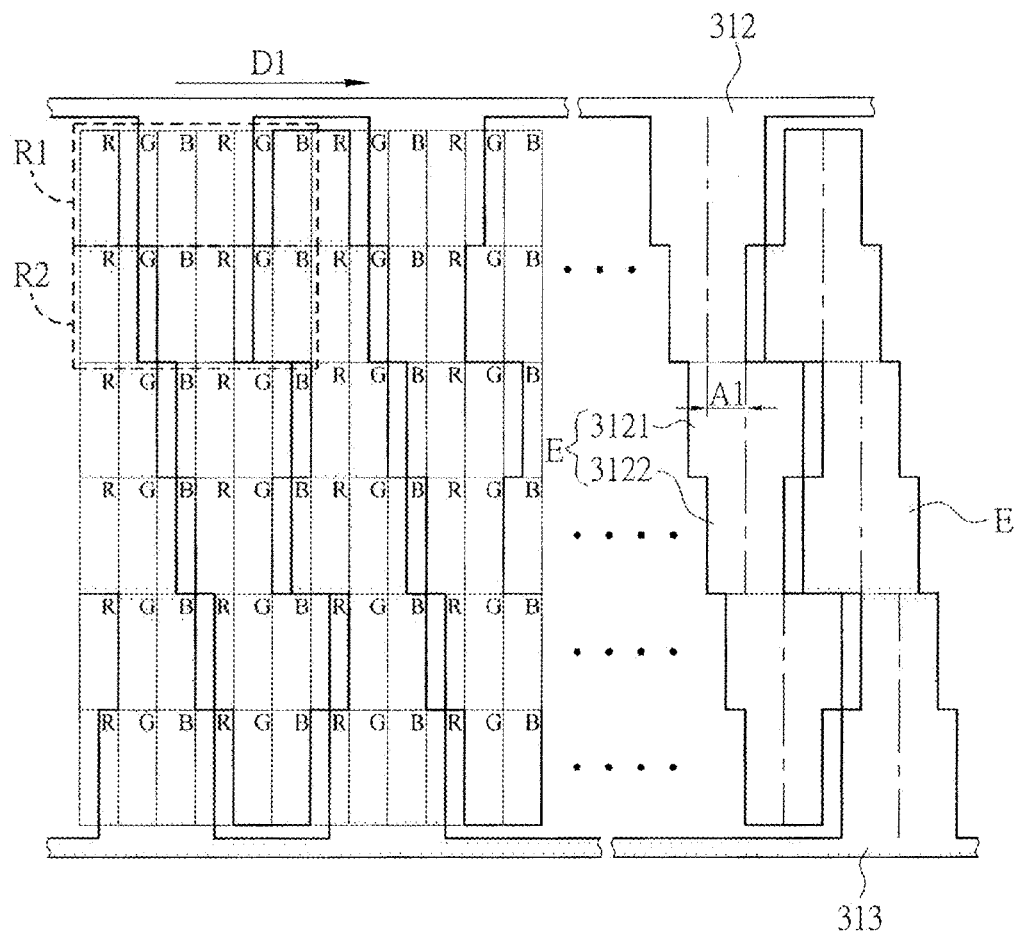

FIGS. 3A to 3C are schematic diagrams showing another 3D image display apparatus 3 according to the embodiment of the disclosure. Different from the 3D image display apparatus 2, the 3D image display apparatus 3 includes a 3D image optical structure 31, which is different from the 3D image optical structure 22 of the 3D image display apparatus 2.

The 3D image optical structure 31 comprises a first substrate 311, a plurality of first optical units 312, a plurality of second optical units 313, a second substrate 314 and a liquid crystal layer 315. The first optical units 312 are disposed on one side of the first substrate 311 along the first direction D1, and each of the first optical units 312 is electrically connected to each other. The second optical units 313 are disposed along the first direction D1 and interlaced with the first optical units 312 on the same side of the first substrate 311, and each of the second optical units 313 is electrically connected to each other. The second substrate 314 is opposite to the first substrate 311, and the liquid crystal layer 315 is disposed between the first substrate 311 and the second substrate 314.

Each of the first substrate 311 and the second substrate 314 is a transparent substrate, such as a glass substrate. Each of the first optical units 312 and the second optical units 313 is a transparent electrode, which can be made of, for example, indium tin oxide (ITO), indium zinc oxide (IZO), fluorine doped tin oxide (FTO), aluminum zinc oxide (AZO), gallium zinc oxide (GZO), ZnO, or $SnO_2$. In practice, two sets of alternately arranged transparent electrodes (not shown) are configured on the second substrate 314, and the material of the transparent electrodes is the same as that of the first optical units 312 and the second optical units 313.

Each first optical unit 312 has a plurality of first portions 3121 corresponding to a first region R1 of the pixels P and a plurality of second portions 3122 corresponding to a second region R2 of the pixels P. In more detailed, the first region R1 is a region including two pixels P, and the second region R2 is region including two additional pixels P and located adjacent to the first region R1. In this embodiment, the length of the first portion 3121 is a length of a pixel P, and the width thereof is a width of a pixel P (or the width of three sub-pixels). Besides, the length of the second portion 3122 is a length of a pixel P, and the width thereof is a width of two sub-pixels. In other words, a width along the first direction D1 of the first portion 3121 is not equal to a width along the first direction D1 of the second portion 3122, and an area of the first portion 3121 is not equal to an area of the second portion 3122.

When the light passes through the first optical unit 312, the ranges of the first region R1 and the second region R2 irradiated by the light are different due to that the first portion 3121 and the second portion 3122 have different areas. Accordingly, the first region R1 and the second region R2 will have different light transmittance ratios in total. The first region R1 corresponding to the first portion 3121 has larger aperture ratio, and the second region R2 corresponding to the second portion 3122 has smaller aperture ratio. The compensation of the aperture ratios of adjacent regions R1 and R2 can effectively reduce the moiré issue and prevent the color shift.

In this case, a first portion 3121 and a second portion 3122 together construct an optical element E, and a plurality of the optical element E connected to each other construct one first optical unit 312. As shown in FIG. 3C, the first portion 3121 and the second portion 3122 of a single optical element E have the same center axis (or a symmetrical axis), and a plurality of optical elements E sequentially shift for a first interval A1 along the first direction D1. Herein, a width of the first interval A1 is equal to the width of a sub-pixel. In other words, the interval between the center axes of two connected optical elements E is equal to the width of a sub-pixel.

The structure of the second optical unit 313 is a reversed pattern of the first optical unit 312. Accordingly, when the first optical unit 312, the second optical unit 313 and the liquid crystal layer 315 are employed as the light shielding structure, a high voltage level is applied to the second optical unit 313 as a low voltage level is applied to the first optical unit 312.

To be noted, in this embodiment, the 3D image optical structure 31 is disposed on the display panel 21. However, in practice, it is possible to change their relative positions. For example, the 3D image optical structure 31 can also be disposed between the display panel 21 and the backlight module. Besides, the dimensions of the above-mentioned first portion 3121, second portion 3122, first region R1 and second region R2 are for illustrations only and are not to limit the disclosure. The specifications and dimensions of these components can be varied depending to the requirements of products and designs.

In practice, the first optical unit and the second optical unit of the 3D image optical structure may have various aspects. In one aspect, the first optical unit and the second optical unit usually have similar structure but have the first and second portions in opposite arranging sequences. Thus, referring to FIGS. 4A to 4C, the following descriptions will illustrate the first optical unit only. Herein, FIGS. 4A to 4C are schematic diagrams showing various aspects of the first optical unit according to the embodiment of the disclosure.

Figure 4A:
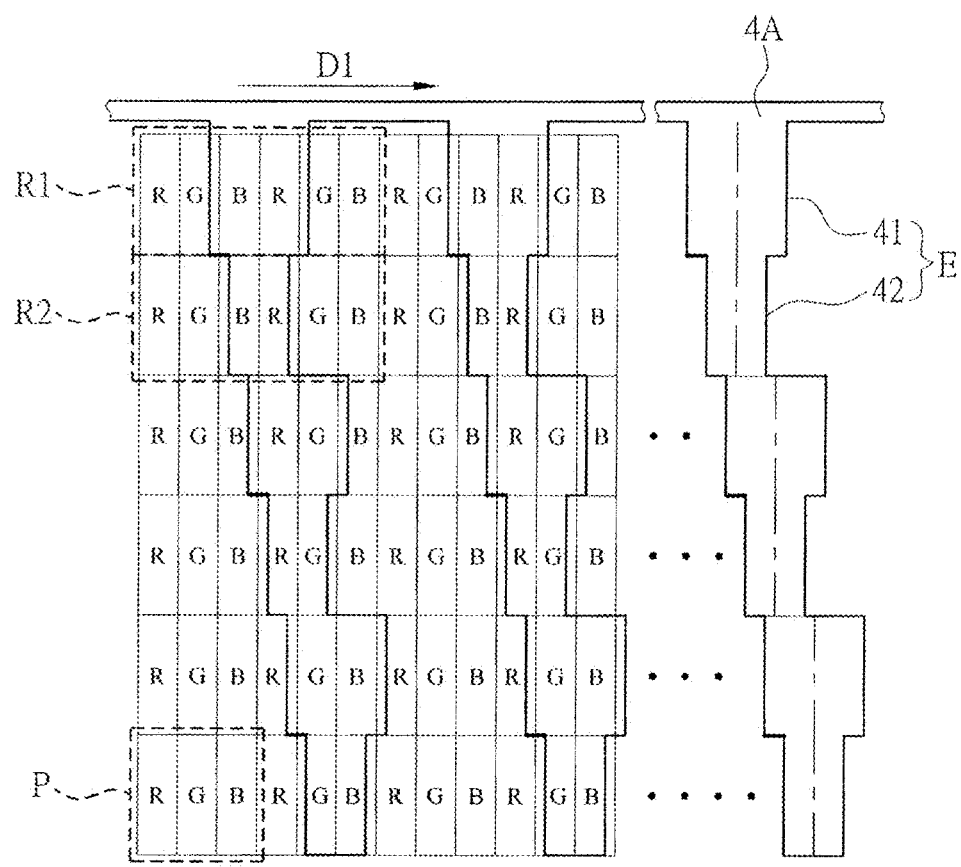
FIGS. 4A to 4C are schematic diagrams showing various aspects of the first optical unit according to the embodiment of the disclosure.

Different from the above-mentioned first optical unit 312, as shown in FIG. 4A, the width of the first portion 41 of the first optical unit 4A is equal to the width of 2.5 sub-pixels, and the width of the second portion 42 is equal to the width of 1.5 sub-pixels. In this case, a first portion 41 and a second portion 42 together construct an optical element E. The first portion 41 and the second portion 42 of a single optical element E have the same center axis, and a plurality of optical elements E sequentially shift along the first direction D1. Herein, the optical elements E are shifted for the width of a sub-pixel.

Figure 4B:
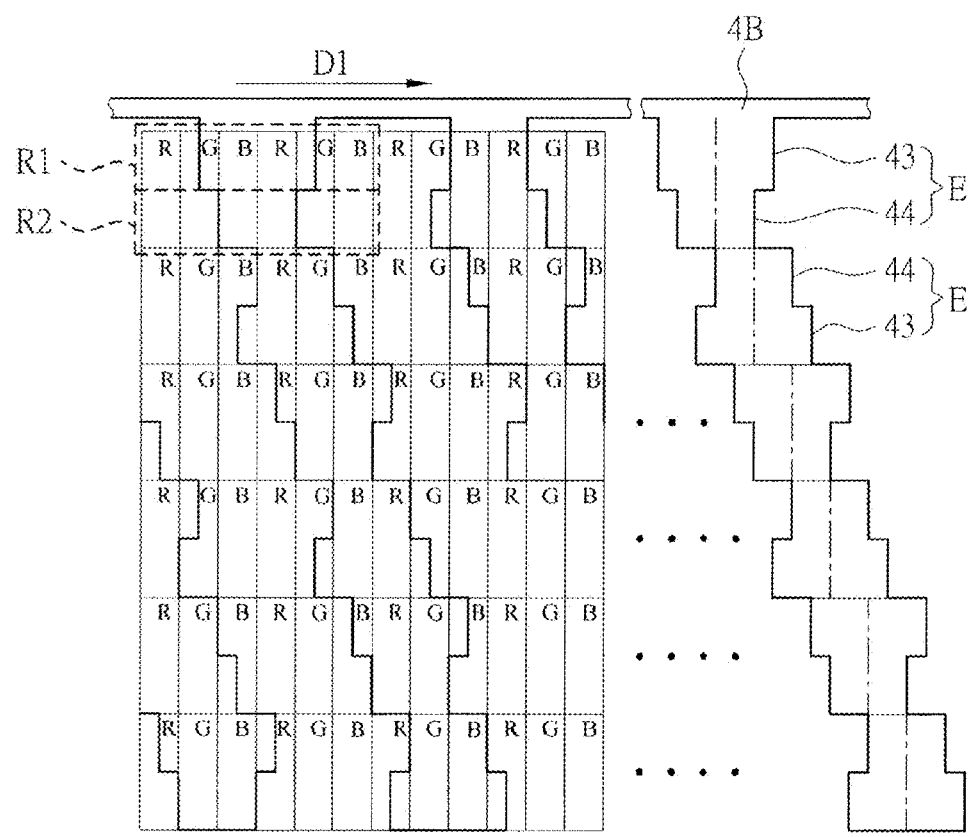
Figure 4C:
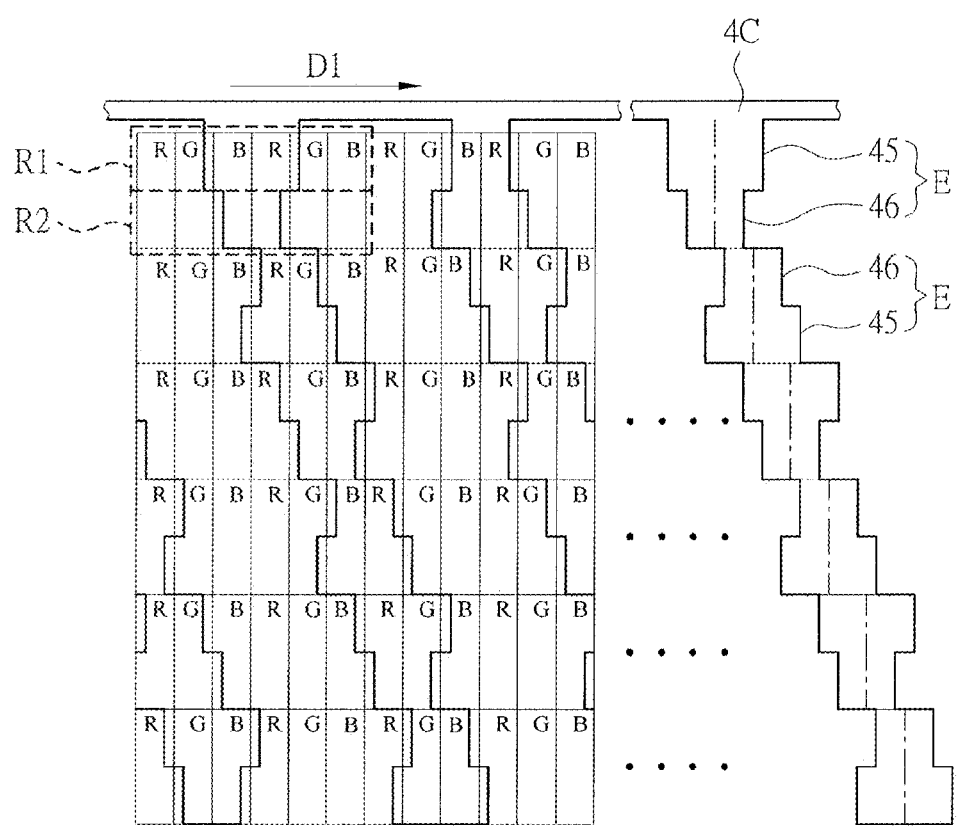

As shown in FIG. 4B, the first optical unit 4B has a plurality of first portions 43 corresponding to a first region R1 of the pixels and a plurality of second portions 44 corresponding to a second region R2 of the pixels. The first region R1 is a region containing upper regions of two pixels, and the second region R2 is a region containing down regions of the two pixels. In this aspect, the length of the first portion 43 is equal to the length of 0.5 pixels P, and the width thereof is equal to the width of 3 sub-pixels; otherwise, the length of the second portion 44 is equal to the length of 0.5 pixels P, and the width thereof is equal to the width of 2 sub-pixels.

In addition, a first portion 43 and a second portion 44 together construct an optical element E. The first portion 43 and the second portion 44 of a single optical element E have the same center axis, and a plurality of optical elements E sequentially shift along the first direction D1. Herein, the optical elements E are shifted for the width of a sub-pixel. The optical elements E of a single first optical unit 4B are normally and reversely arranged in sequence and connected. Besides, the optical elements E of two adjacent first optical units 4B are arranged in opposite.

Different from the first optical unit 4B, as shown in FIG. 4C, the width of the first portion 45 of the first optical unit 4C is equal to the width of 2.5 sub-pixels, and the width of the second portion 46 thereof is equal to the width of 1.5 sub-pixels. In practice, the widths of the first and second portions can be varied according to the actual needs, and the widths thereof can be an integral or non-integral times of the width of the sub-pixel.

Figure 5A:
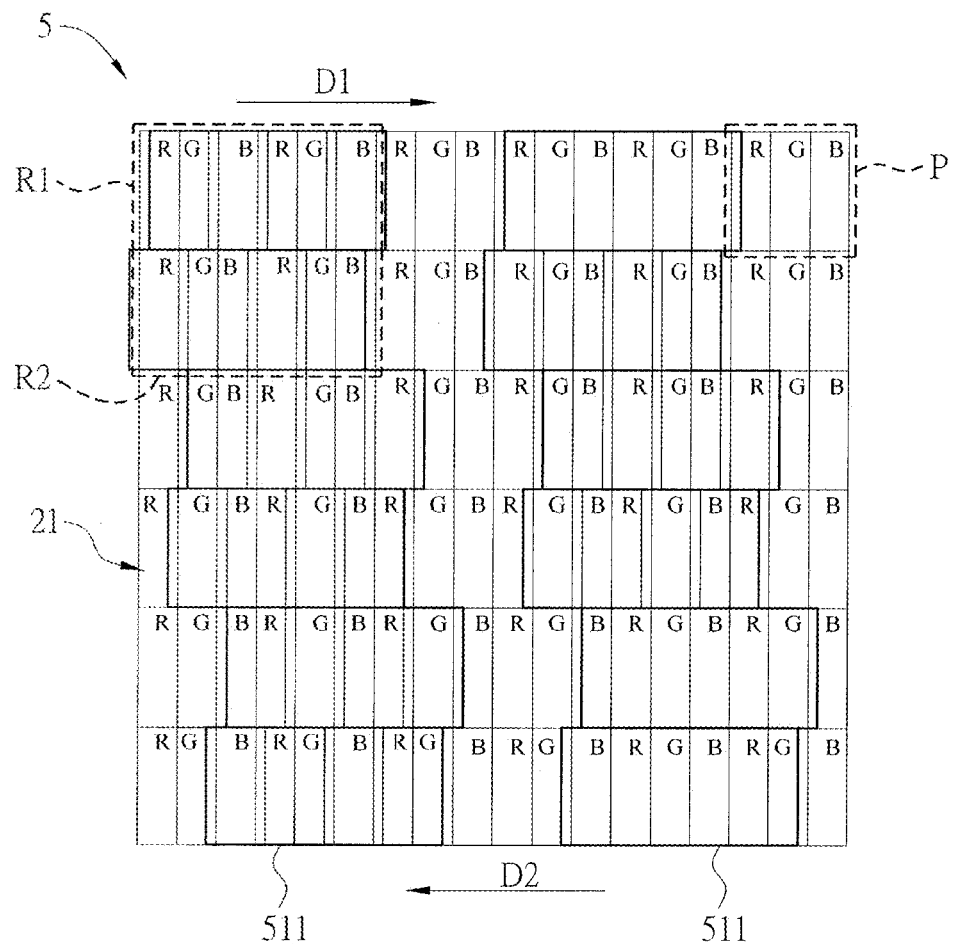
FIGS. 5A and 5B are schematic diagrams showing another 3D image display apparatus according to the embodiment of the disclosure.
Figure 5B:
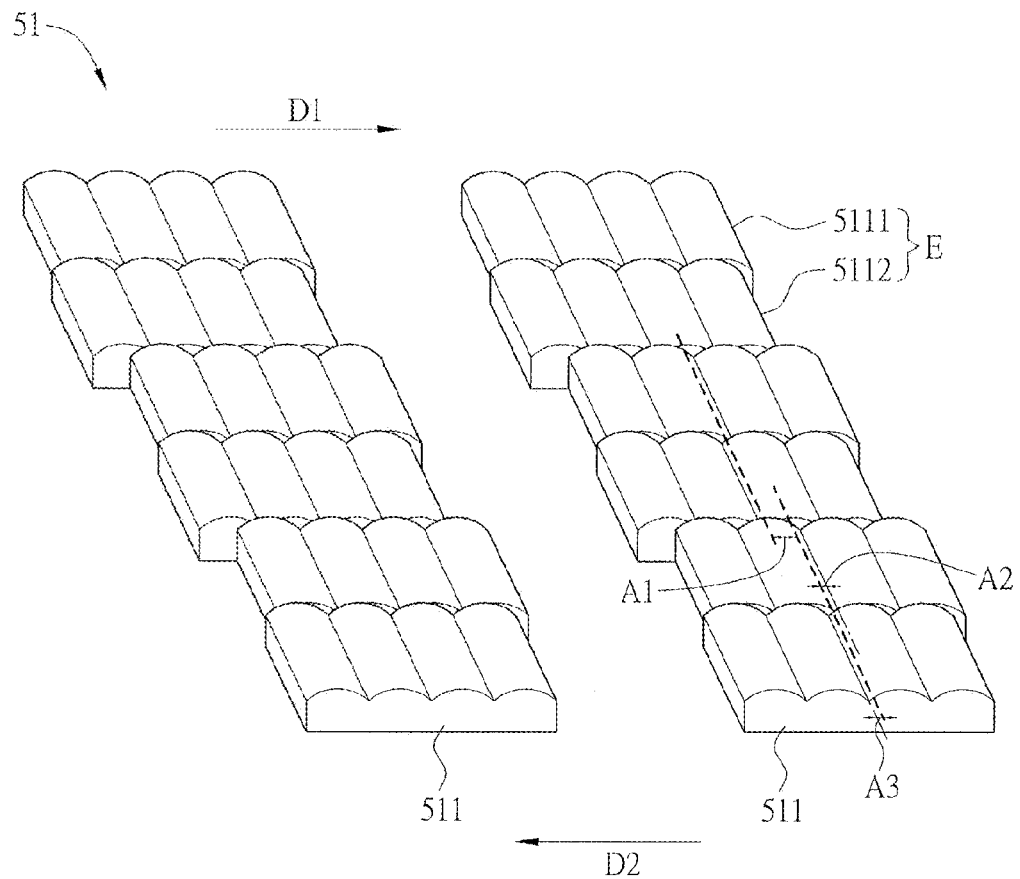

FIGS. 5A and 5B are schematic diagrams showing another 3D image display apparatus 5 according to the embodiment of the disclosure. The 3D image display apparatus 5 includes a display panel 21 and a 3D image optical structure 51. The 3D image optical structure 51 is disposed on one side of the display panel 21 and includes a plurality of first optical units 511 disposed on the display panel 21 along a first direction D1. Each of the first optical units 511 has a plurality of optical elements E, and each of the optical elements E has a first portion 5111 and a second portion 5112 disposed adjacent to each other.

The first portion 5111 corresponds to a first region R1 of the pixel P, and the second portion 5112 corresponds to a second region R2 of the pixel P. In more detailed, a region of the pixels P covered by the vertical projection of the first portions 5111 of the first optical units 511 is defined as the first region R1, and a region of the pixels P covered by the vertical projection of the second portions 5112 of the first optical units 511 is defined as the second region R2. In this embodiment, the lengths of the first region R1 and the second region R2 are equal to the length of a pixel P, and the widths thereof are equal to the width of two pixels P (also equal to the width of six sub-pixels).

In this aspect, a center axis of each of the optical elements E of each first optical unit 511 are disposed adjacent to each other and are sequentially shifted by a first interval A1 toward the first direction D1. A center axis of the first portion 5111 is shifted for a second interval A2 with respect to the center axis of the optical element E toward the first direction D1. A center axis of the second portion 5112 is shifted for a third interval A3 with respect to the center axis of the optical element E toward a second direction D2. A width of the first interval A1 is equal to the width of a sub-pixel, and a width of the second interval A2 and a width of the third interval A3 are equal to the width of one quarter of sub-pixel, respectively. Herein, the first direction D1 and the second direction D2 are opposite directions. In this embodiment, the first portion 5111 and the second portion 5112 of each optical element E of the first optical unit 511 are optical lenses, and they have multiple protrusions with different shift direction on the side opposite to the display panel 21.

As mentioned above, since the second portion 5112 of each optical element E of the 3D image optical structure 51 is shifted toward the second direction D2 with respect to the first portion 5111, the effective aperture positions of the first region R1 and the corresponding second region R2 are misaligned. This configuration can effectively reduce the moiré issue by compensation and prevent the color shift. Therefore, the 3D image optical structure 51 is a means for shifting aperture positions.

Figure 6A:
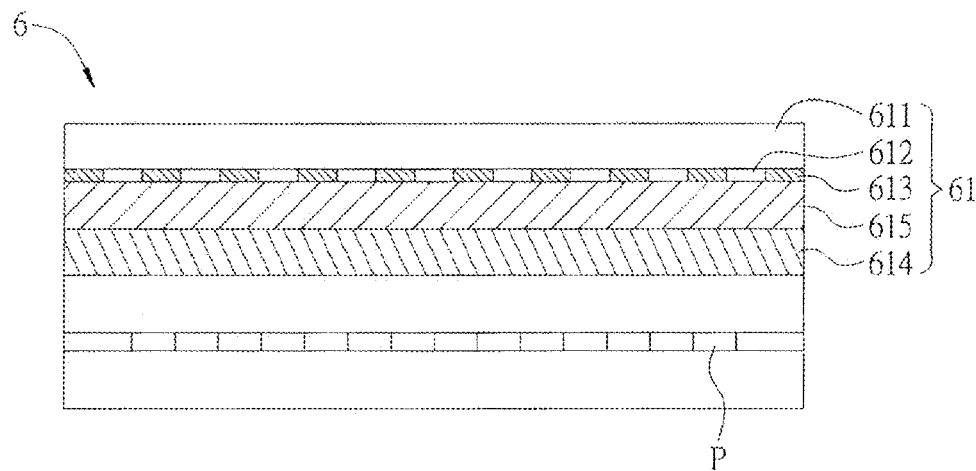
FIGS. 6A and 6B are schematic diagrams showing another 3D image display apparatus according to the embodiment of the disclosure.
Figure 6B:
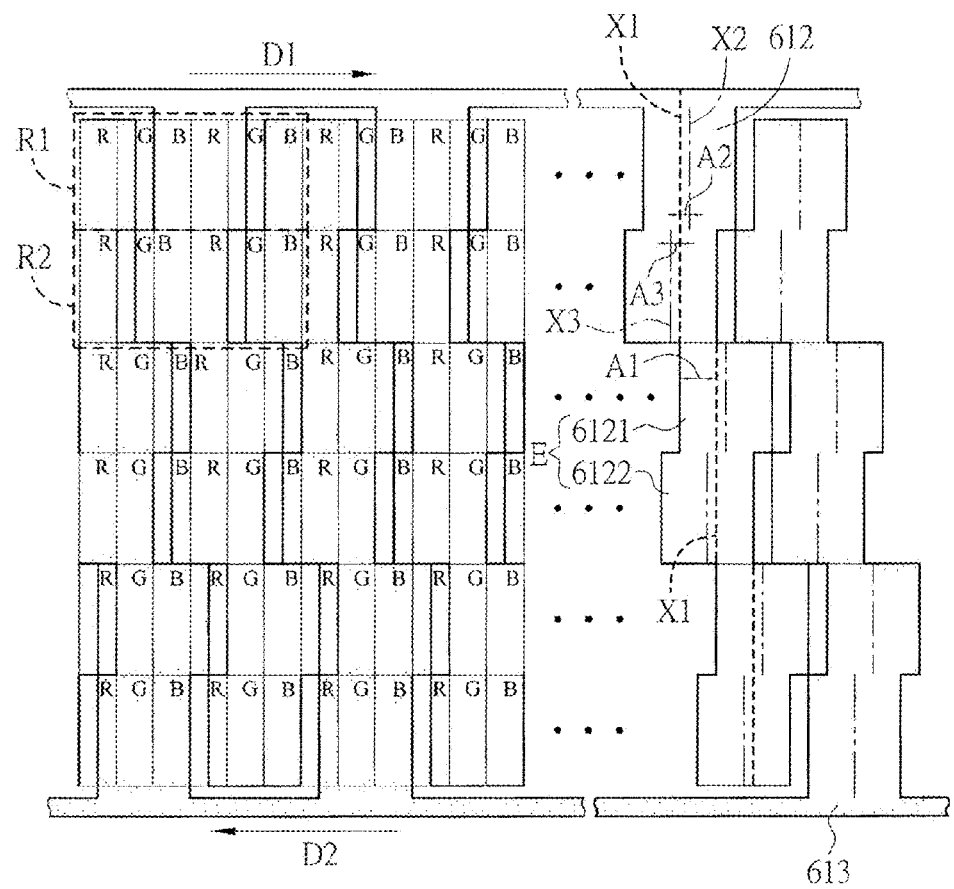

FIGS. 6A and 6B are schematic diagrams showing another 3D image display apparatus 6 according to the embodiment of the disclosure. Different from the 3D image display apparatus 5, the 3D image display apparatus 6 includes a 3D image optical structure 61, which is different from the 3D image optical structure 51 of the 3D image display apparatus 5. The 3D image optical structure 61 includes a first substrate 611, a plurality of first optical units 612, a plurality of second optical units 613, a second substrate 614 and a liquid crystal layer 615.

The first optical units 612 are disposed on one side of the first substrate 611 along the first direction D1, and each of the first optical units 612 is electrically connected to each other. The second optical units 613 are disposed along the first direction D1 and interlaced with the first optical units 612 on the same side of the first substrate 611, and each of the second optical units 613 is electrically connected to each other. The second substrate 614 is opposite to the first substrate 611, and the liquid crystal layer 615 is disposed between the first substrate 611 and the second substrate 614.

Each of the first substrate 611 and the second substrate 614 is a transparent substrate, such as a glass substrate. Each of the first optical units 612 and the second optical units 613 is a transparent electrode, which can be made of, for example, indium tin oxide (ITO), indium zinc oxide (IZO), fluorine doped tin oxide (FTO), aluminum zinc oxide (AZO), gallium zinc oxide (GZO), ZnO, or $SnO_2$. In practice, two sets of alternately arranged transparent electrodes (not shown) are configured on the second substrate 614, and the material of the transparent electrodes is the same as that of the first optical units 612 and the second optical units 613.

Each first optical unit 612 has a plurality of optical elements E, and each optical element E includes a first portion 6121 corresponding to a first region R1 of the pixel P and a second portion 6122 corresponding to a second region R2 of the pixel P. The first region R1 is a region containing two pixels P, and the second region R2, which is disposed adjacent to the first region R1, is a region also containing two pixels P. In this embodiment, the dimensions of the first portion 6121 and the second portion 6122 are the same. In more detailed, the length thereof is equal to the length of a pixel P, and the width thereof is equal to the width of 2.5 sub-pixels. In other words, an area of the first portion 6121 is equal to an area of the second portion 6122, and a width along the first direction D1 of the first portion 6121 is equal to a width along the first direction D1 of the second portion 6122.

A center axis X1 of each of the optical elements E of each first optical unit 612 are sequentially shifted by a first interval A1 toward the first direction D1, and a width of the first interval A1 is equal to the width of one sub-pixel. A center axis X2 of the first portion 6121 is shifted for a second interval A2 with respect to the center axis X1 of the optical element E toward the first direction D1. A center axis X3 of the second portion 6122 is shifted for a third interval A3 with respect to the center axis X1 of the optical element E toward a second direction D2. For example, the second interval A2 and the third interval A3 are equal to the width of 0.25 sub-pixels, respectively. Herein, the first direction D1 and the second direction D2 are opposite directions. As mentioned above, the second portion 6122 of each optical element E is shifted toward the second direction D2 with respect to the first portion 6121. This configuration can effectively reduce the moiré issue by compensation and prevent the color shift.

In addition, the structure of the second optical unit 613 is a reversed pattern of the first optical unit 612. So the detailed descriptions thereof will be omitted. Besides, the dimensions of the above-mentioned first portion 6121, second portion 6122, first region R1 and second region R2 are for illustrations only and are not to limit the disclosure. The specifications and dimensions of these components can be varied depending to the requirements of products and designs.

Figure 7:
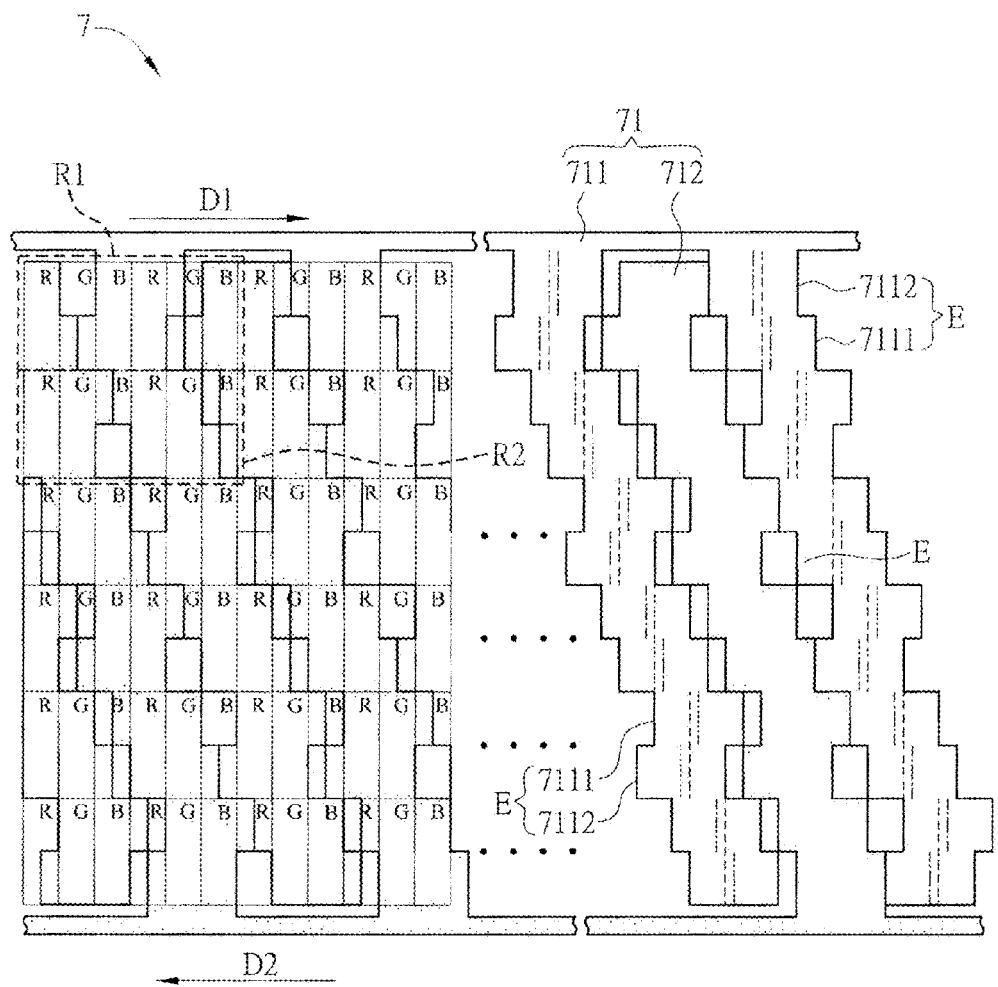
FIG. 7 is a schematic diagram showing another 3D image display apparatus according to the embodiment of the disclosure.

FIG. 7 is a schematic diagram showing another 3D image display apparatus 7 according to the embodiment of the disclosure. Different from the 3D image display apparatus 6, the 3D image display apparatus 7 includes a 3D image optical structure 71 having a first optical unit 711 and a second optical unit 712, which are different from the first optical unit 612 and the second optical unit 613. Since the structure of the second optical unit 712 is opposite to that of the first optical unit 711, only the first optical unit 711 will be described as below.

In each optical element E of the first optical unit 711 of this embodiment, the first region R1 corresponding to the first portion 7111 contains the upper regions of two pixels, and the second region R2 corresponding to the second portion 7112 contains down regions of the same two pixels. The length of the first portion 7111 is equal to the length of 0.5 pixels P, and the width thereof is equal to the width of 2.5 sub-pixels. In addition, the length of the second portion 7112 is equal to the length of 0.5 pixels P, and the width thereof is equal to the width of 2.5 sub-pixels. The optical elements E of two adjacent first optical units 711 have opposite configuration sequence.

Besides the above mentioned optical lens (physical lens), more embodiments, which can adjust the voltages applied to each of the electrodes so as to cause the rotation of the arrangement of the liquid crystal molecules in the liquid crystal layer of the optical structures. These additional embodiments can also achieve the optical effect similar to the previous embodiment.

This configuration at least has the advantage of providing a flexible optical effect so as to adjust the optical effect depending on various products. Besides, the cost and difficulty for manufacturing the physical optical lens are relatively higher. On the contrary, the present embodiment does not need the physical optical lens, so the 3D image display apparatus of the invention can be thinner, lighter and easily fabricated, and have lower manufacturing cost.

Besides, an additional advantage of these embodiments is to provide more application flexible. For example, when the 3D image display apparatus is set up, it is still possible to adjust between different visual effects according to different machines, user favorites, detecting results of eye tracking devices, or time sequences.

Figure 8A:
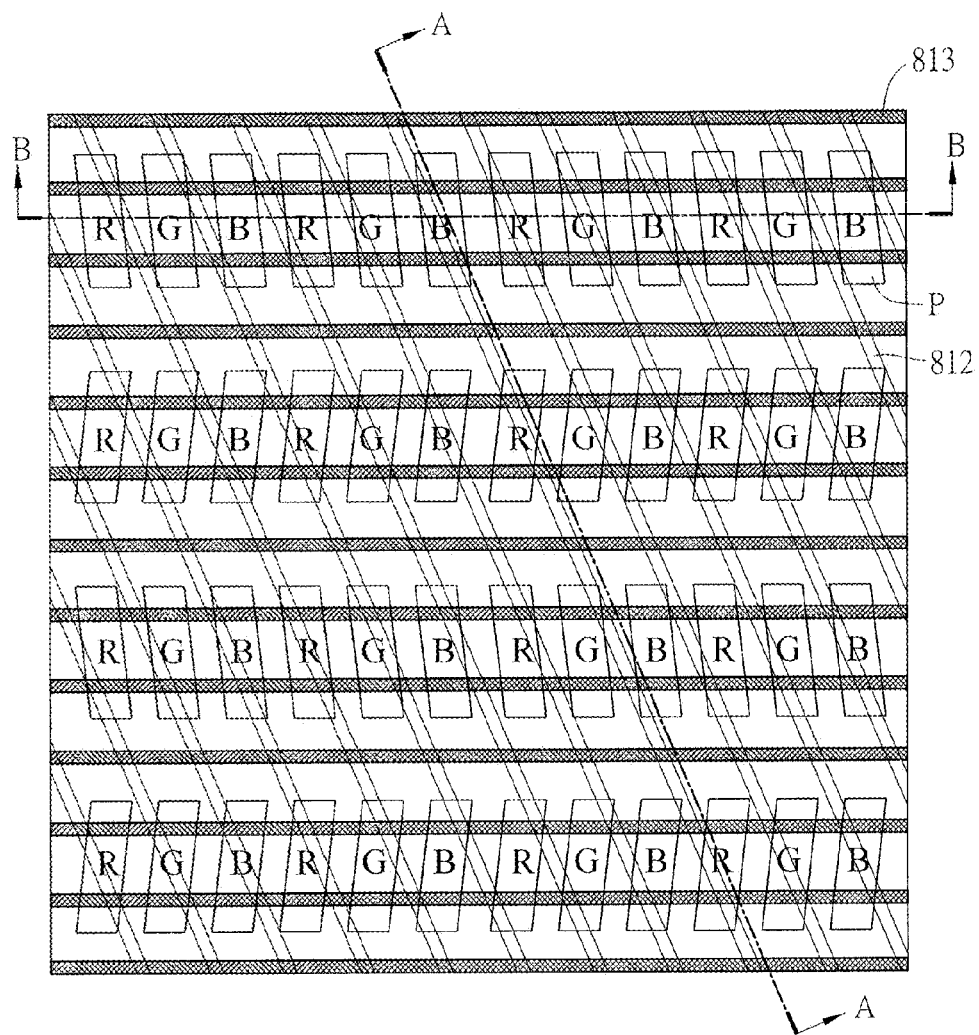
FIG. 8A is a schematic diagram showing another 3D image display apparatus according to the embodiment of the disclosure.
Figure 8B:
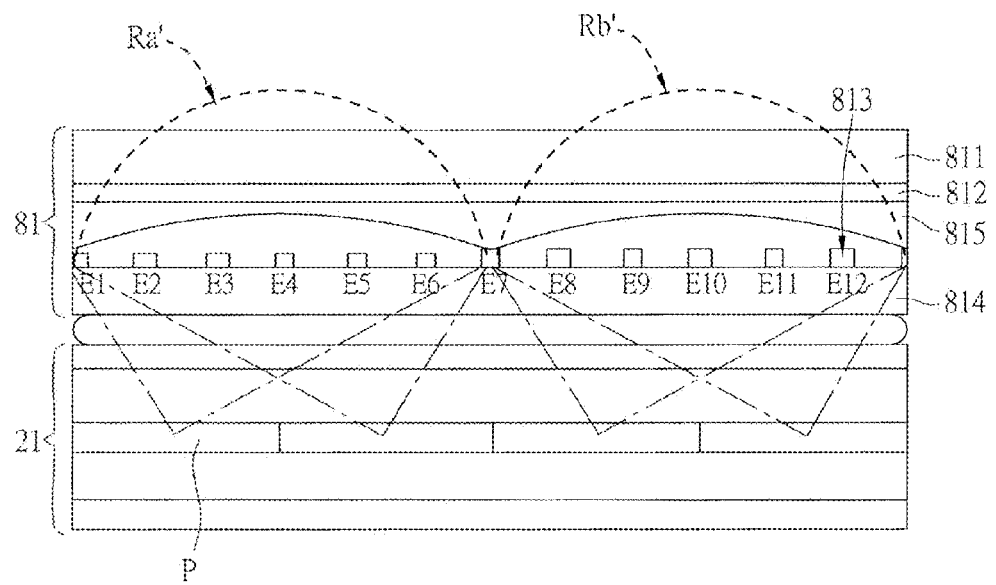
FIG. 8B is a sectional view of another 3D image display apparatus according to the embodiment of the disclosure along the line AA.
Figure 8C:
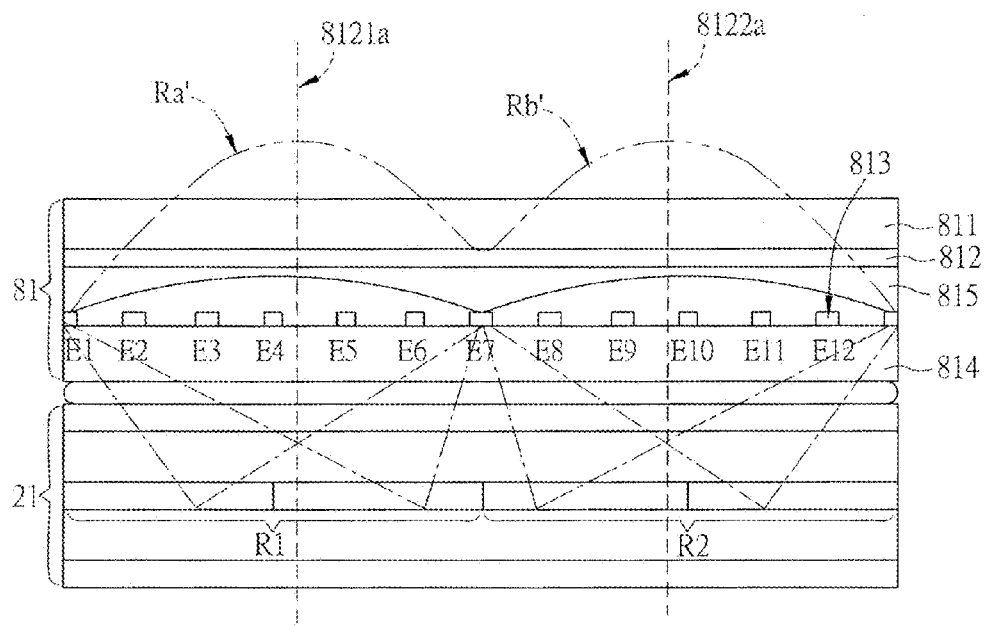
FIG. 8C is a sectional view of another 3D image display apparatus according to the embodiment of the disclosure along the line AA.
Figure 8D:
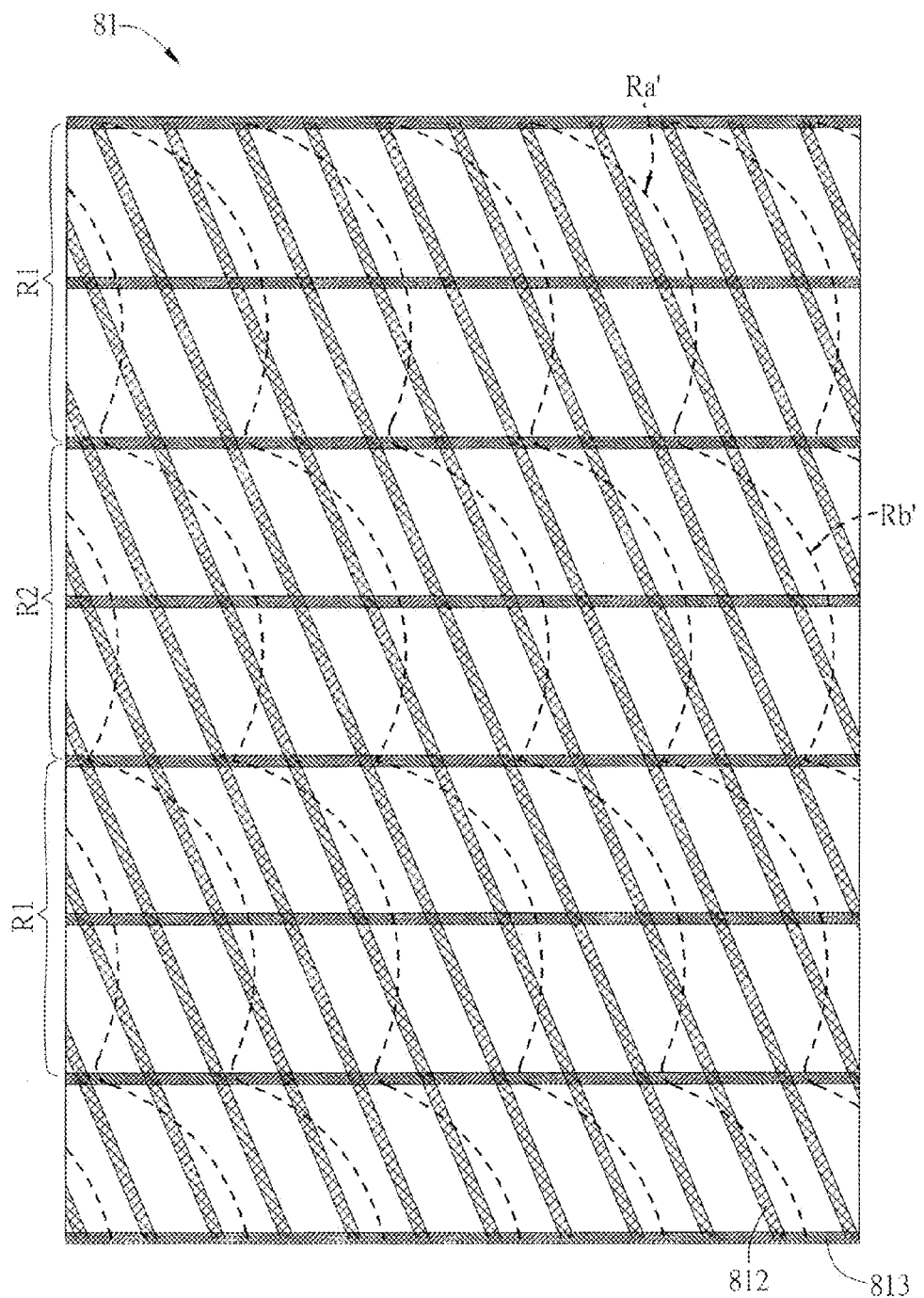
FIG. 8D is a schematic optical diagram of the virtual lens of the 3D image display apparatus of FIG. 8C.
Figure 8E:
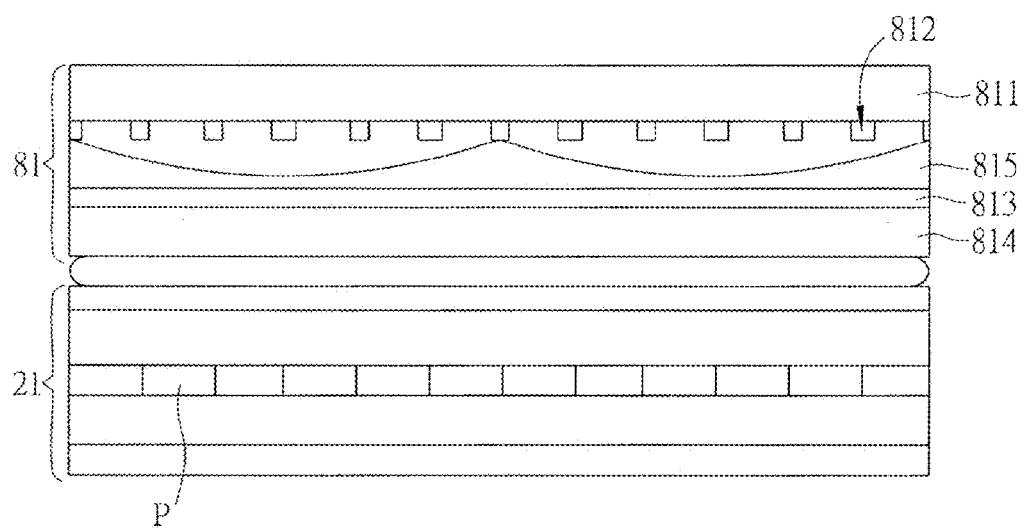
FIG. 8E is a schematic sectional diagram of another embodiment taken along the line BB in FIG. 8A.

FIG. 8A is a schematic diagram showing another 3D image display apparatus according to the embodiment of the disclosure. FIGS. 8B and 8C are schematic sectional views of other embodiments taken along the line AA in FIG. 8A. FIG. 8D is a schematic optical diagram of the virtual lens of the 3D image device in FIG. 8C. FIG. 8E is a schematic sectional diagram of another embodiment taken along the line BB in FIG. 8A.

With reference to FIGS. 8A to 8E, the 3D image optical structure 81 includes a first substrate 811 and a plurality of first electrode set 812. The 3D image optical structure 81 further includes a plurality of second electrode set 813, a second substrate 814 and a liquid crystal layer 815. The second substrate 814 is disposed opposite to the first substrate 811, and the liquid crystal layer 815 is positioned between the first substrate 811 and the second substrate 814. The first and second electrode sets 812 and 813 include a plurality of transparent strip-like electrodes or the electrodes of other types.

Similar to the above embodiment, the transparent substrate is, for example, a glass substrate. The transparent electrode can be made of, for example but not limited to, indium tin oxide (ITO), indium zinc oxide (IZO), fluorine doped tin oxide (FTO), aluminum zinc oxide (AZO), gallium zinc oxide (GZO), ZnO, or $SnO_2$.

Referring to FIG. 8A, the first electrode set 812 is disposed on the side of the first substrate 811 facing the liquid crystal layer 815. The second electrode set 813 is disposed on the side of the second substrate 814 facing the liquid crystal layer 815. The second electrode set 813 and the first electrode set 812 cross each other.

To be noted, each of the strip-like electrodes of the second electrode set 813 is arranged in a slant manner on the display panel 21. That is, a non-zero included angle is formed between each of the strip-like electrodes of the first electrode set 812 and each of the strip-like electrodes of the second electrode set 813, and the non-zero included angle is favorably $\arctan(1/3)$, $\arctan(5/12)$, $\arctan(1/4)$ or $\arctan(1/6)$.

With reference to FIGS. 8A and 8B, an aspect of this embodiment is to adjust the voltage between the first electrode set 812 and the second electrode set 813 so as to cause the rotation of the liquid crystal of the liquid crystal layer 815 to form the effect similar to the virtual optical lens. In other words, by applying a specific voltage to the first and second electrode sets 812 and 813, the liquid crystal layer 815 can form virtual lens structures, which are equivalent to the above-mentioned optical units.

In this embodiment, when the display apparatus operates in the landscape mode, the voltage of each of the strip-like electrodes of the first electrode set 812 can be fixed at 0V while the voltage of each of the strip-like electrodes E1~E12 of the second electrode set 813 can be adjusted as the following table.

TABLE 1

| electrode | | | | | | |
|---|---|---|---|---|---|---|
| E1 | E2 | E3 | E4 | E5 | E6 | E7 |
| Voltage (V) 5 | 2 | 0.5 | 0.1 | 0.5 | 2 | 5 |

| electrode | | | | |
|---|---|---|---|---|
| E8 | E9 | E10 | E11 | E12 |
| Voltage (V) 0.5 | 0.1 | 0.5 | 2 | 5 |

When the voltage of each of the strip-like electrodes E1~E12 of the second electrode set 813 is adjusted as the table 1, the liquid crystal layer 815 will form the lens structures (optical units) shown in FIG. 8B, and the optical units have the first portions Ra' and the second portions Rb'. The first portion Ra' corresponds to the first regions R1 of the pixels P of the display panel 21, and the second portion Rb' corresponds to the second regions R2 of the pixels P.

In another embodiment, the voltage of each of the strip-like electrodes of the first electrode set 812 can be still fixed at 0V while the second voltage of each of the strip-like electrodes E1~E12 of the second electrode set 813 can be adjusted as the following table.

TABLE 2

| | electrode | | | | | | |
|---|---|---|---|---|---|---|---|
| | E1 | E2 | E3 | E4 | E5 | E6 | E7 |
| Voltage (V) | 5 | 2 | 0.5 | 0.1 | 0.1 | 0.5 | 2 |
| | electrode | | | | | | |
| | E8 | E9 | E10 | | E11 | | E12 |
| Voltage (V) | 0.5 | 0.1 | 0.1 | | 0.5 | | 5 |

When the voltage of each of the strip-like electrodes of the second electrode set 813 is adjusted as the table 2, the first portion Ra' and the second portion Rb' of the lens structures formed in the liquid crystal layer 815 are as shown in FIG. 8C. In this embodiment, the first portion Ra' is asymmetric to a second axis 8121a that is orthogonal to the display panel 21, and the second portion Rb' is asymmetric to a first axis 8122a that is orthogonal to the display panel 21. In other words, the first portion Ra' and the second portion Rb' are disposed together as if two cut-off lens are connected to each other. Therefore, the light passing through the lens structure (optical unit) can be slightly shifted to the center of the 3D image optical structure 81 (so that the image can be more concentrated). Hence, the moiré issue and the color shift problem caused by different viewing angles of the user can be improved.

Moreover, when the display apparatus operates in the portrait mode, the voltage of each of the strip-like electrodes of the second electrode set 813 can be fixed at 0V and the voltage of each of the strip-like electrodes of the first electrode set 812 is adjusted as the table 1, and then the lens structure as shown in FIG. 8E will be formed in the liquid crystal layer 815.

Accordingly, by adjusting the voltage difference between the first and second electrode sets 812 and 813, the liquid crystal of the liquid crystal layer 815 in different regions can be provided with different rotation direction to achieve the optical effect of virtual lens.

To be noted, the first portion Ra' and the second portion Rb' in the figure are the appearance of virtual optical lenses. These virtual lenses are used to explain the technology of the invention and are not real components.

Figure 9A:
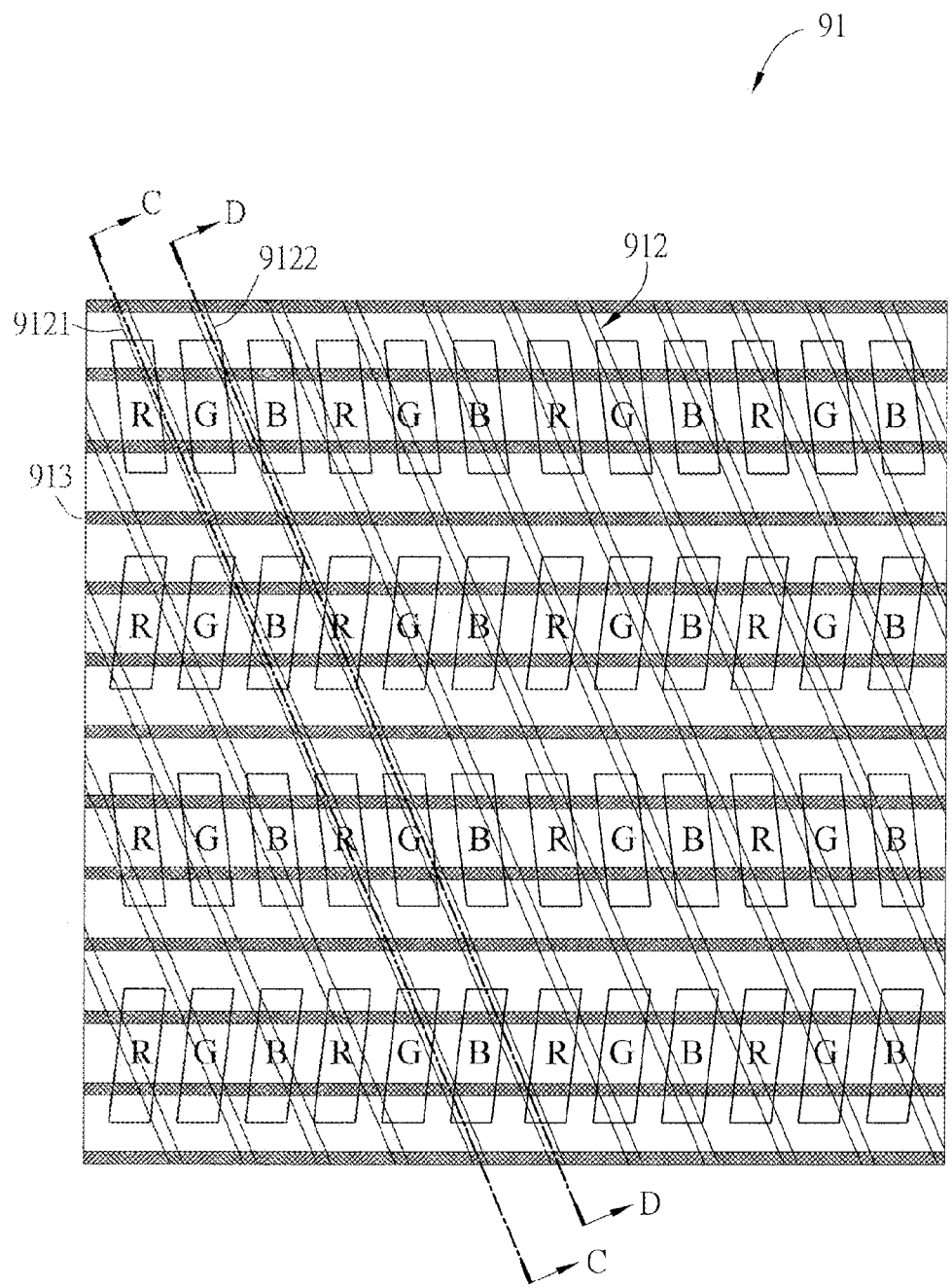
FIG. 9A is a schematic diagram showing another 3D image display apparatus according to the embodiment of the disclosure.
Figure 9B:
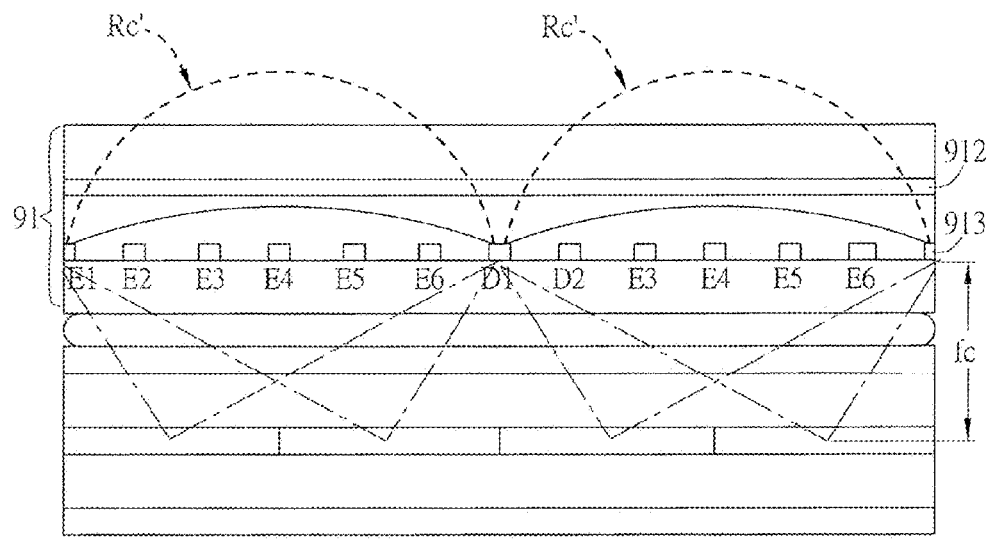
FIG. 9B is a sectional view of FIG. 9A along the line CC.
Figure 9C:
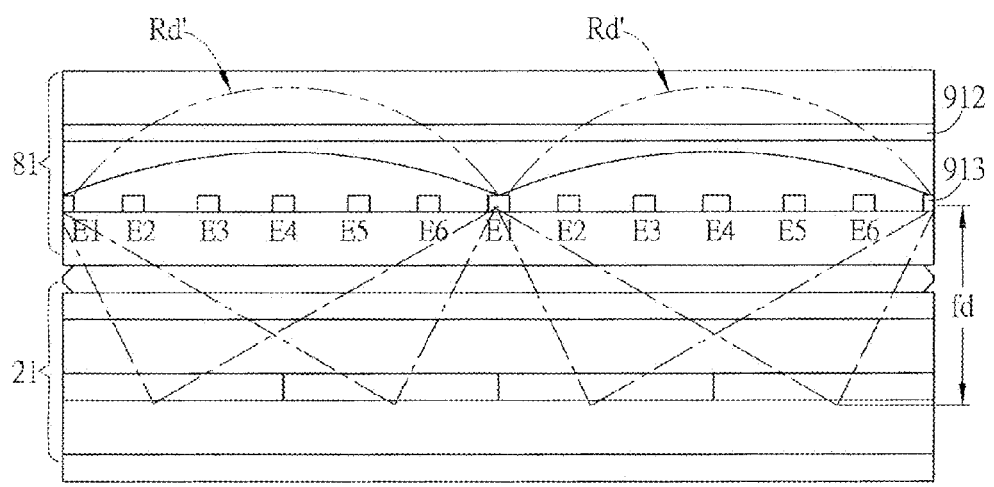
FIG. 9C is a sectional view of FIG. 9A along the line DD.
Figure 9D:
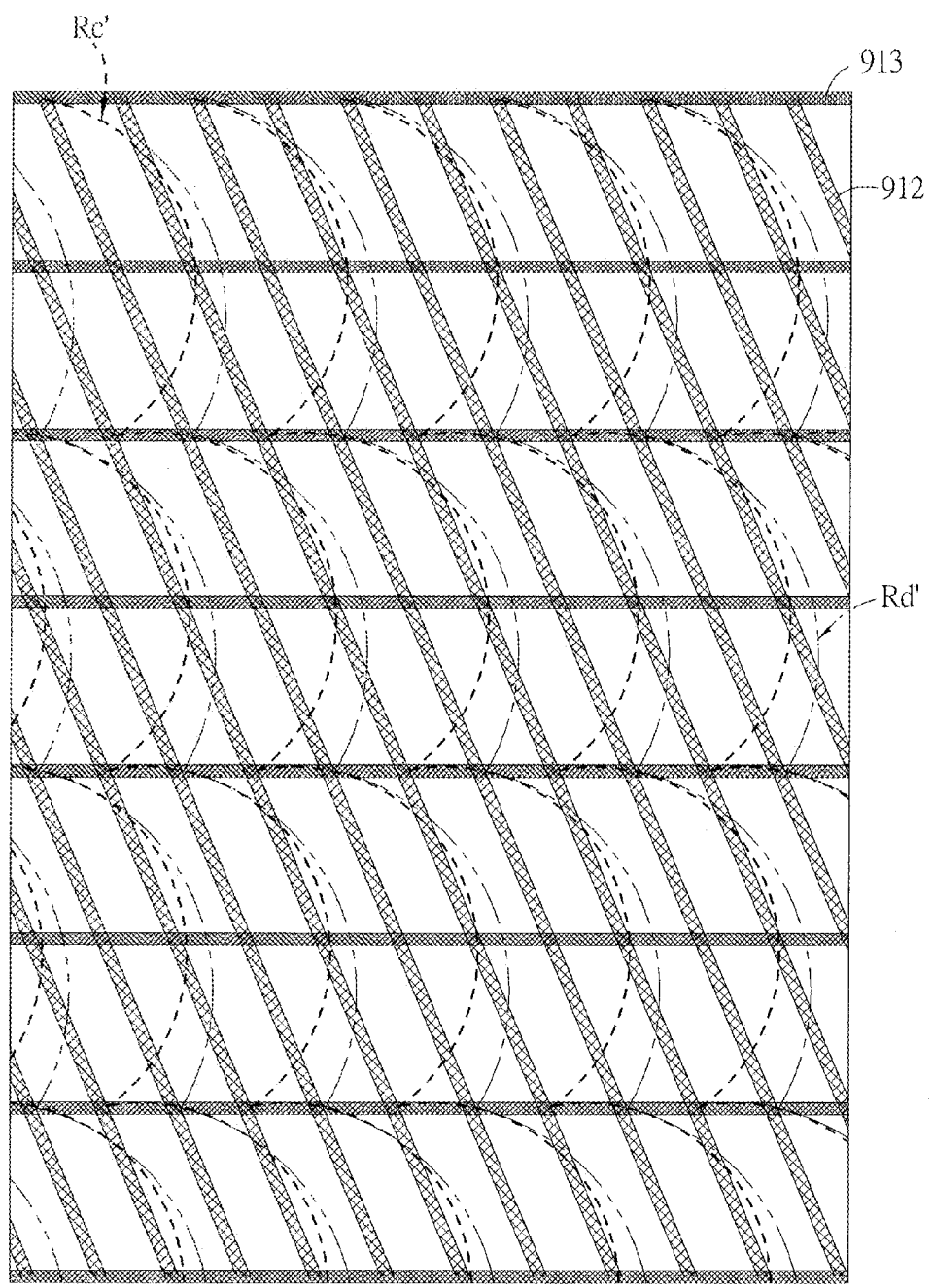
FIG. 9D is an optical diagram of the virtual lens of the 3D image display apparatus of FIG. 9A.

FIG. 9A is a schematic diagram showing another 3D image display apparatus according to the embodiment of the disclosure, FIG. 9B is a sectional view of FIG. 9A along the line CC, FIG. 9C is a sectional view of FIG. 9A along the line DD, and FIG. 9D is an optical diagram of the virtual lens of the 3D image display apparatus of FIG. 9A.

Similar to the above embodiment, the 3D image optical structure 91 of this embodiment can adjust the voltage between the first electrode set 912 and the second electrode set 913 so as to control the liquid crystal molecules of the liquid crystal layer in different regions to rotate to different directions, thereby achieving the optical effect of virtual lenses.

In this embodiment, the voltage U1 of the first strip-like electrodes 9121 of the first electrode set 912 is fixed at 0V and the voltage U2 of the second strip-like electrodes 9122 of the first electrode set 912 is fixed at 2V, and the voltage of each of the strip-like electrodes E1~E6 of the second electrode set 913 is adjusted as the table 3. When the above-mentioned voltages are applied to the electrodes, the liquid crystal layer corresponding to the first strip-like electrodes 9121 will form the lens structure (optical unit) as shown in FIG. 9B while the liquid crystal layer corresponding to the second strip-like electrodes 9122 will form the lens structure (optical unit) as shown in FIG. 9C. The first curvature radius fc of the lens Rc' corresponding to the first strip-like electrode 9121 is different from the second curvature radius fd of the lens Rd' corresponding to the second strip-like electrode 9122, and the first curvature radius fc is shorter than the second curvature radius fd. Besides, the centers of the lenses Rc' and Rd' don't overlap each other in a vertical projection direction (not shown).

TABLE 3

| electrode | E1 | E2 | E3 | E4 | E5 | E6 |
|---|---|---|---|---|---|---|
| voltage (V) | 5 | 2 | 0.2 | 0 | 0.2 | 2 |

Herein, the example is given by that the first strip-like electrodes 9121 and the second strip-like electrodes 9122 are disposed alternately. In other words, the strip-like electrodes of the first electrode set 912 are alternately provided with the voltages U1 and U2. In other embodiments, the application manner of the voltages U1 and U2 can be adjusted, such as two or more first strip-like electrodes 9121 and two or more second strip-like electrodes 9122 are disposed alternately.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A three-dimensional (3D) image display apparatus, comprising:
    a display panel having a plurality of pixels arranged in an array, wherein the pixels have a first region and a second region disposed adjacent to each other, and each pixel includes at least two sub-pixels; and
    a 3D image optical structure disposed on one side of the display panel and comprising:
    a plurality of first optical units disposed along a first direction, wherein each of the first optical units has at least one first portion and at least one second portion, the first portion has a first center plane, the second portion has a second center plane, and the first center plane and the second center plane are perpendicular to the display panel;
    wherein the first portions of the first optical units correspond to the first region, the second portions of the first optical units correspond to the second region, the first portion is asymmetric with respect to the first center plane, and the second portion is asymmetric with respect to the second center plane, the first region corresponds to two sub-pixels and the second region corresponds to another two sub-pixels.

2. The 3D image display apparatus of claim 1, wherein each of the first optical units is an optical lens.

3. The 3D image display apparatus of claim 1, wherein a width of the first region is substantially equal to the width of two sub-pixels, and a width of the second region is substantially equal to the width of two sub-pixels.

4. The 3D image display apparatus of claim 1, wherein the first optical units are disposed adjacent to each other.

5. The 3D image display apparatus of claim 1, wherein the second portion is disposed adjacent to the first portion and disposed along the first direction.

6. The 3D image display apparatus of claim 1, wherein the 3D image optical structure further comprises:
- a first substrate;
- a second substrate opposite to the first substrate; and
- a liquid crystal layer disposed between the first substrate and the second substrate;
- wherein the side of the first substrate facing the liquid crystal layer is configured with a first electrode set, the side of the second substrate facing the liquid crystal layer is configured with a second electrode set, and when a potential difference exists between the first electrode set and the second electrode set, a plurality of lens structures are formed in the liquid crystal layer and equivalent to the first optical units, wherein the first electrode set includes a plurality of first strip-like electrodes, the second electrode set includes a plurality of second strip-like electrodes, and the first electrode set and the second electrode set cross each other.

7. The 3D image display apparatus of claim 6, wherein a non-zero included angle is formed between each of the first strip-like electrodes of the first electrode set and each of the second strip-like electrodes of the second electrode set, and the non-zero included angle is $\arctan(1/3)$, $\arctan(5/12)$, $\arctan(1/4)$ or $\arctan(1/6)$.

8. The 3D image display apparatus of claim 6, wherein the first electrode set further includes a plurality of second strip-like electrodes, which are disposed alternately with the plurality of first strip-like electrodes.

9. The 3D image display apparatus of claim 8, wherein the liquid crystal layer corresponding to the plurality of first strip-like electrodes of the first electrode set forms at least one first lens structure, and the first lens structure has a first curvature radius, and the liquid crystal layer corresponding to the plurality of second strip-like electrodes of the first electrode set forms at least one second lens structure, the second lens structure has a second curvature radius, and the first curvature radius is different from the second curvature radius.

* * * * *